US011341994B1

(12) United States Patent
Goker et al.

(10) Patent No.: US 11,341,994 B1
(45) Date of Patent: May 24, 2022

(54) TAPE LIBRARY SYSTEM WITH INTEGRATED, FEEDBACK-BASED ENVIRONMENTAL AND DATA DURABILITY CONTROL

(71) Applicant: QUANTUM CORPORATION, San Jose, CA (US)

(72) Inventors: Turguy Goker, Oceanside, CA (US); James P. Peng, Santa Maria, CA (US); Scott M. Rockwell, Aurora, CO (US); Mathew Aschenberg, Centennial, CO (US); David Tindall, III, Parker, CO (US); Hoa Le, Orange, CA (US); Carsten H. Prigge, Elizabeth, CO (US); Tj Quirk, Parker, CO (US); Robert Munio, Superior, CO (US); Steve Cooper, Costa Mesa, CA (US); Robert Yang, Greenwood Village, CO (US); Bruno H. Hald, Parker, CO (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 17/331,564

(22) Filed: May 26, 2021

(51) Int. Cl.
| | | |
|---|---|---|
| *G11B 5/40* | (2006.01) | |
| *G11B 5/55* | (2006.01) | |
| *G11B 5/008* | (2006.01) | |

(52) U.S. Cl.
CPC ........ *G11B 5/5543* (2013.01); *G11B 5/00813* (2013.01); *G11B 5/40* (2013.01)

(58) Field of Classification Search
None
See application file for complete search history.

(56) References Cited

U.S. PATENT DOCUMENTS

| | | | | |
|---|---|---|---|---|
| 6,725,394 B1* | 4/2004 | Bolt | ...................... | G06F 3/0617 |
| | | | | 360/78.03 |
| 7,414,805 B1* | 8/2008 | Ochs | ...................... | G11B 15/68 |
| | | | | 360/69 |
| 9,431,054 B1* | 8/2016 | Goker | .................. | G06F 11/1076 |
| 10,176,067 B1* | 1/2019 | Bramhill | ............. | G06F 11/2294 |
| 10,460,757 B1* | 10/2019 | Judd | .................. | G11B 5/59633 |
| 2003/0067703 A1* | 4/2003 | Holmes | ................ | G11B 23/042 |
| | | | | 360/69 |
| 2007/0230054 A1* | 10/2007 | Takeda | ................. | G11B 5/7368 |
| | | | | 360/134 |

(Continued)

*Primary Examiner* — Peter Vincent Agustin
(74) *Attorney, Agent, or Firm* — Roeder & Broder LLP; James P. Broder

(57) ABSTRACT

A tape cartridge for use in one or more tape drives of a tape library includes a cartridge housing and a magnetic tape. The magnetic tape is retained within the cartridge housing. The magnetic tape includes a first tape section that is pre-recorded with calibrated data for evaluating data durability on the magnetic tape. The magnetic tape is usable within the tape library to measure a health of the one or more tape drives and/or confirm a suitability of an operating environment within the tape library in terms of at least one of temperature and humidity. The calibrated data in the first tape section can be further configured for evaluating total transverse dimensional stability on the magnetic tape. The first tape section can include predetermined error patterns to assist in evaluating the data durability on the magnetic tape and/or periodic tape scrubbing operations to enhance data durability on the magnetic tape.

20 Claims, 7 Drawing Sheets

(56) References Cited

U.S. PATENT DOCUMENTS

| | | | |
|---|---|---|---|
| 2008/0022157 A1* | 1/2008 | Chang | G06F 11/0727 |
| | | | 714/42 |
| 2010/0042360 A1* | 2/2010 | Weng | G11B 15/32 |
| | | | 702/142 |
| 2010/0226039 A1* | 9/2010 | Bui | G11B 5/584 |
| | | | 360/77.12 |
| 2011/0182157 A1* | 7/2011 | Hoerger | G11B 15/602 |
| | | | 369/41.01 |
| 2013/0138253 A1* | 5/2013 | Chainer | H05K 7/20281 |
| | | | 700/282 |
| 2014/0053015 A1* | 2/2014 | Hampton | G06F 11/1666 |
| | | | 714/6.1 |
| 2014/0372556 A1* | 12/2014 | Holst | H04L 41/0668 |
| | | | 709/217 |
| 2019/0221234 A1* | 7/2019 | Peng | G11B 5/00878 |
| 2019/0348067 A1* | 11/2019 | Goker | G11B 5/00813 |
| 2020/0411044 A1* | 12/2020 | Hashimoto | G11B 5/735 |

\* cited by examiner

TAPE LIBRARY SYSTEM WITH INTEGRATED, FEEDBACK-BASED ENVIRONMENTAL AND DATA DURABILITY CONTROL

BACKGROUND

Automated media library systems, such as automated tape library systems, are commonly utilized for purposes of writing data to and reading data from media cartridges, such as magnetic tape cartridges. Magnetic tape cartridges are configured to retain and/or store magnetic tape that can be used in a magnetic tape drive for purposes of reading data from and writing data to the magnetic tape. During use of the magnetic tape drive, a tape head of the magnetic tape drive is configured to be in direct contact with the magnetic tape from the magnetic tape cartridge so that user data can be written to and read from the magnetic tape as the magnetic tape moves across the tape head at varying speed from low speed to high speed. Magnetic tape cartridges have been used extensively because they provide a convenient way to house and support a length of magnetic tape for engagement by a transducer in the tape drive while protecting the tape upon removal of the cartridge. Moreover, magnetic tape cartridges facilitate economic and compact storage of data.

Over the years, storage capacity within individual media cartridges has increased dramatically, with such storage capacity being typically doubled for each new generation of storage media, e.g., approximately every two to three years. It is appreciated that tape capacity growth is a function of multiple variables, with the areal density of the tape being a main contributor to the tape capacity growth. Areal density is defined by the size and shape of the written bit, which is typically rectangular-shaped. More particularly, the areal density can be defined as a product of the bit length (or linear density of the recording) and the bit width (or track pitch). The size and shape of the written bit can also be described in terms of the Bit Aspect Ratio (BAR), which is the ratio of the track pitch to the bit length. It is further appreciated that the selection of track pitch and bit length (or linear density) is done based on tracking, dimensional stability, and magnetic recording, which is dominated by head and media interface and design.

The main goal for such media library systems can be described as achieving high data durability for long-term archival and back up applications with minimum total cost of ownership (TCO), and high performance for both writing and restoring user data. One of the main contributors to TCO for long term usage is the energy consumption. In the case of tape, a major contributor to TCO is the cost of the environmental controls to ensure data durability due to aging and dimensional stability, which both are functions of the temperature and humidity conditions although with different levels of impact. As areal densities increase, the track and linear densities will also increase, resulting in ever decreasing tracking margins and loss of signal to noise ratio (SNR), which both collectively result in loss of data durability due to an increase in User Bit Error Rate (UBER) due to media dimensional stability and head-to-tape interface problems. Data durability is defined in terms of UBER, which is dictated by the tape's internal error correcting code (ECC) format that is based on dual orthogonal interleaved C1 and C2 ECC format where C1 is designed to work in error detect and correct mode per data channel and C2 is a cross channel protection designed to work in erasure mode. The UBER performance can be modeled using binominal equations where per channel input error rate dictates what the eventual output system UBER will be. It is appreciated that by maintaining a low error rate at the channel output, very high data durability can be maintained.

The challenges for long term archival and backup applications are to achieve high data durability, low cost with multi-channel removable data storage media over the life of the media with varying environmental conditions and changes in the media magnetic and physical characteristics with minimum energy consumption and minimum latency to first user data byte; and be able to do this as areal densities increase for capacity increase per cartridges. Another problem with environmental controls is the orthogonal control of temperature and humidity without causing condensation. As the data density is increased, the sensitivity to temperature, humidity and dew point extremes is intensified due to tape media expansion and contraction. This is key to minimization of energy cost since dimensional stability dependence is different for temperature and humidity for tape media.

One solution to such problems is to make sure environmental conditions are extremely tight for the life of the media. However, this can result in higher cost of energy as storage times increase, which is the key for archival storage. Other methods include writing tapes inside a strict condition and keeping them at elevated loose conditions to save energy cost. However, in this case, the latency to first byte of data will suffer since it may require long media stabilization times for changes in environment also due to the lack of adaptation.

Therefore, it is desired to develop adaptive optimization-based data durability controls where energy usage is minimized while maintaining high overall data durability as a function of the tape's operating modes such as write, read, time dependent archival in order to achieve lower TCO and higher data durability. Stated in another manner, based on the foregoing, it is desired to provide a tape library system that is configured to optimize the conditions of tapes independently for write and read modes such that as tracking margins are reduced and areal densities increase, the data durability, cost of environmental conditions and latency to first byte of data are optimized.

Additionally, with archival storage, the data typically is not accessed frequently and it is stored for long period of times defined by the data retention policies. For this reason, the probability of an undetected silent data corruption is highly likely. Therefore, data scrubbing is an essential part of typical archival storage data durability policies. Periodic checks will help to identify the errors, and repair algorithms can start to migrate the failed data to a new media to maintain the overall data durability. More specifically, the goal of data scrubbing is to detect silent errors and to calculate the quality of written data to predict early failures such that the system can make a decision to repair and migrate data before waiting for the next scrubbing time.

Error events can be classified as two categories, deterministic hard errors and soft errors. Detecting deterministic hard errors is a repeatable process where any drive will be able to detect the error on a given media. However, the soft errors are strongly dependent on the joint performance of the media-drive combination making it difficult to quantify the nature of the error event to determine if the data needs to be migrated or repaired. Simply stated, it is difficult to differentiate if the soft errors are due to problems with a media or with the drive. Additionally, given the longer scrubbing periods, it is important to quantify media quality to determine if the written data needs to be repaired and migrated before the next scrubbing time. By detecting the severity of the soft errors, the scrubbing can reduce the probability of future silent errors therefore maintaining the durability of the data. The effectiveness of the process will be a function of how well the system can determine the level of soft errors without being negatively influenced by any media and drive interchangeability-related problems. Therefore, a suitable detection algorithm is key to reliably detect and quantify soft errors such that the data can be repaired and migrated as a preventive measure.

SUMMARY

The present invention is directed toward a tape cartridge for use in one or more tape drives of a tape library. In various embodiments, the tape cartridge includes a cartridge housing and a magnetic tape. The magnetic tape is retained within the cartridge housing. The magnetic tape includes a first tape section that is pre-recorded with calibrated data for evaluating data durability on the magnetic tape. In such embodiments, the magnetic tape is usable within the tape library to one of measure a health of the one or more tape drives and confirm a suitability of an operating environment within the tape library in terms of at least one of temperature and humidity.

In some embodiments, the calibrated data in the first tape section is configured for evaluating total transverse dimensional stability on the magnetic tape.

In certain embodiments, the magnetic tape is usable to both measure the health of the one or more tape drives and confirm the suitability of the operating environment within the tape library in terms of at least one of temperature and humidity.

In some embodiments, the magnetic tape further includes a second tape section that is pre-recorded with special calibrated data for evaluating data durability on the magnetic tape.

In certain embodiments, the first tape section includes predetermined error patterns to assist in evaluating the data durability on the magnetic tape.

In some embodiments, the first tape section includes periodic tape scrubbing operations to enhance data durability on the magnetic tape.

Additionally, in certain embodiments, other sections of the magnetic tape can include user data such that any given tape cartridge with the first tape section that is pre-recorded with the described calibrated data can have user data on the rest of the magnetic tape other than the described first tape section. For example, in some such embodiments, the magnetic tape further includes at least one data section that is configured such that user data can be written to and read from the at least one data section. Further, in such embodiments, the magnetic tape is further usable within the tape library to restore the user data using the at least one data section.

The present invention is further directed toward a tape library including one or more tape drives, and the tape cartridge as described above that is usable in the one or more tape drives for measuring the health of the one or more tape drives. In one embodiment, the tape library includes a plurality of tape drives; and the tape cartridge is usable in the plurality of tape drives for measuring the health of the plurality of tape drives.

In certain embodiments, the tape library further includes a controller including a processor that is configured to implement an algorithm that adapts for variable environmental conditions in terms of at least one of temperature and humidity based at least in part on a reading of the magnetic tape by the one or more tape drives. In some such embodiments, the algorithm is configured to use a transverse dimensional stability versus error rate map to determine an optimal temperature and humidity for writing to and/or reading from the magnetic tape while limiting overall transverse dimensional stability.

Additionally, the present invention is further directed toward a method for evaluating a tape library including one or more tape drives, the method including the steps of retaining a magnetic tape within a cartridge housing of a tape cartridge; pre-recording a first tape section of the magnetic tape with calibrated data for evaluating data durability on the magnetic tape; and reading the magnetic tape with the one or more tape drives; wherein the magnetic tape is usable within the tape library to one of measure a health of the one or more tape drives and confirm a suitability of an operating environment within the tape library in terms of at least one of temperature and humidity.

Further, the present invention is also directed toward a method for manufacturing a tape cartridge for use in one or more tape drives of a tape library, the method including the steps of providing a cartridge housing; and retaining a magnetic tape within the cartridge housing, the magnetic tape including a first tape section that is pre-recorded with special calibrated data for evaluating data durability within the magnetic tape; wherein the magnetic tape is usable within the tape library to one of measure a health of the one or more tape drives and confirm a suitability of an operating environment within the tape library in terms of at least one of temperature and humidity.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
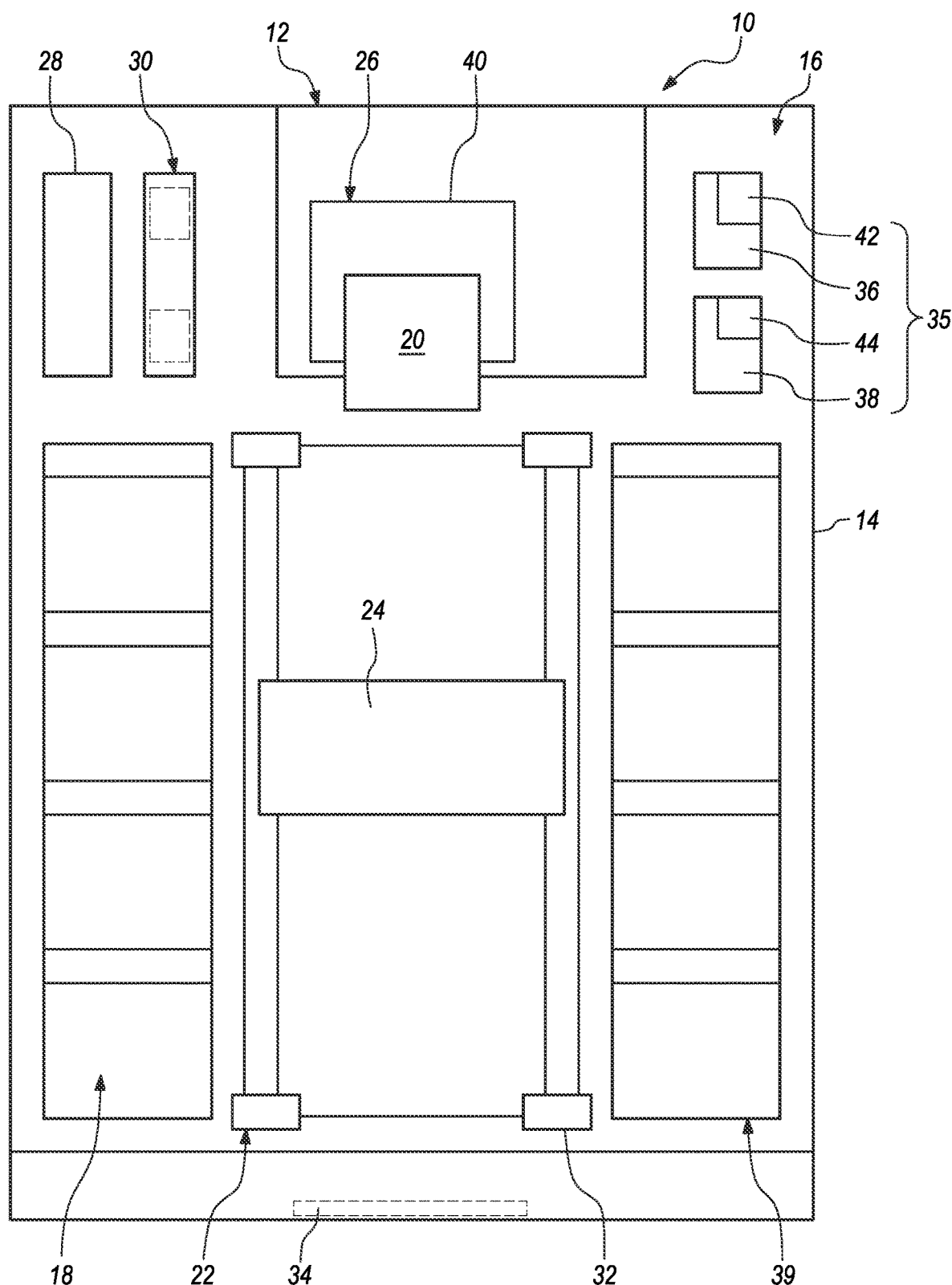
FIG. 1 is a simplified schematic top view illustration of an embodiment of an automated media library system having features of the present invention.

As provided herein, special calibrated media can either be included within one or more partitions or sections of a user cartridge or can comprise an entire user cartridge. It is appreciated that the partitions or sections including the special calibrated data can be included at the beginning or end of the tape within the media cartridge, i.e. where user data is not written, or at the top or bottom edges of the tape. In some embodiments, the special calibrated data can be included in sections of the tape in such a manner that it impacts the total user data capacity available on the tape. Alternatively, in other embodiments, the special calibrated data can be included in sections of the tape in such a manner that it does not impact the total user data capacity available on the tape.

The special calibrated media can include data durability metrics captured in write and read and periodic tape scrubbing modes usable to identify conditions of the media and media library system such that optimum environmental conditions can be calculated with independent orthogonal temperature and humidity controls with no condensation. Further, as part of this system, the media and media drives are periodically tested using a scrubbing process to ensure the data integrity such that dimensional change-induced errors are not correlated with media and drive aging-related errors.

It is appreciated that random errors caused by media aging and changes in tape guiding characteristics for tracking such as tape edge degradation and defect acceleration and other non-random errors can have an adverse effect on data durability within the media library system. However, in certain implementations, the system maintains data durability due to such random errors using advanced tape operations (ATO) metrics and pre-written media sections with different levels of error patterns and built-in periodic tape scrubbing operations to insure the highest data durability for archival or back-up applications for high capacity tapes. It is further appreciated that the data durability metrics can be based on original as well as current writing, where the original writing may also include predetermined error patterns written on the calibrated media section to further assist with the determination of data durability due to removable applications isolating drive and media contributions.

Thus, the present invention provides a multi-variable optimization control system, with enhanced metrics in data durability, energy consumption and latency to first byte of user data. Further, in various embodiments, temperature and humidity settings are adaptively and independently controlled with the feedback from the total transverse dimensional stability (TDS) media section and pre-written error pattern media section and ATO metrics to minimize energy consumption as a function of operating conditions and operating modes (read, write) and archival times.

Additionally, based on implementations of the present invention, the media library as a whole, as well as media drives and media cartridges housed within the media library, can better maintain peak performance and longevity.

It is also appreciated that the specially designed media cartridges of the present invention can be especially valuable going forward as future generation cartridges will take a substantially long time for reading the full tape, and may require multiple passes across the tape surface due to the number of data tracks to be included, such that reading full tapes to quality may otherwise be unfeasible.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic top view illustration of an automated media library system 10 (also referred to herein simply as a "media library"), such as a tape library system in certain embodiments, including a media drive system 12, such as a tape drive system in certain embodiments, having features of the present invention. In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges. More specifically, it is noted that the media library 10 illustrated in FIG. 1 is just one non-exclusive example of a media library 10 usable with the present invention, and no limitations are intended based on the specific type and/or size of the media library 10 shown in FIG. 1. Although the media library 10 shown and described relative to FIG. 1 is specifically shown and/or described at times as a tape cartridge library or tape library, it is understood that the present invention is equally applicable for use with any other suitable types of libraries using other types of media cartridges, such as optical disks, magnetic disk drives, emulated or virtual media drives, etc., as non-exclusive examples. However, for ease of discussion, FIG. 1 and certain other Figures herein are sometimes described using tape cartridges as the applicable media cartridge, although this is not intended to restrict or limit the present invention in this manner.

In various embodiments, as illustrated in FIG. 1, the media library 10 can include one or more of: (i) a library housing 14 that defines an library interior 16, (ii) a plurality of storage slots 18 that are each configured to receive and selectively retain (and store) a storage media cartridge 20, such as a tape cartridge in certain embodiments (also sometimes referred to herein simply as a "media cartridge", "storage media", or simply "media"), (iii) a rack assembly 22, (iv) a media cartridge retrieval assembly 24 (also sometimes referred to herein as a "retrieval assembly"), (v) the media drive system 12 including one or more media drives 26, such as tape drives in certain embodiments, (vi) a power supply 28, (vii) a control system 30, (viii) one or more racks 32, (ix) a graphical user interface 34 (illustrated in phantom, and also sometimes referred to herein as a "GUI"), and (x) a climate controller 35. In some embodiments, the climate controller 35 can include one or more temperature controllers 36 (only one temperature controller 36 is illustrated in FIG. 1), and/or one or more humidity controllers 38 (only one humidity controller 38 is illustrated in FIG. 1).

As an overview, the media library 10 is uniquely configured to implement a multi-variable closed-loop optimization algorithm that adapts for variable environmental conditions within a calibrated total transverse dimensional stability section of media, with calibrated dimensional stability and data durability metrics, and other critical media and drive performance metrics. Stated in another manner, the media library 10 can include and/or be used in conjunction with the media drive system 12 that utilizes reference media 20 that includes pre-recorded calibrated special data that is usable for measuring the health of the media drives 26, to confirm the suitability of the operating environment of the media library 10, and/or for one or more other suitable purposes. The media library 10 and/or the noted algorithm can further incorporate built-in periodic tape scrubbing operations to insure the highest data durability for archival or back-up applications for high capacity tapes.

In some embodiments, special calibrated media can either be included within one or more partitions or sections of the media cartridge 20 or can comprise the entire media cartridge. For example, in certain such embodiments, the media cartridge 20 can retain a magnetic tape 250 (illustrated in FIG. 2) that includes a first tape section that is pre-recorded with calibrated data for evaluating data durability on the magnetic tape 250 and/or for evaluating total transverse dimensional stability on the magnetic tape 250. Additionally, in such embodiments, the magnetic tape 250 can be used within the media library 10 to measure a health of the one or more media drives 26 and/or to confirm a suitability of an operating environment within the media library 10 in terms of at least one of temperature and humidity. Further, in some embodiments, the magnetic tape 250 can also include a second tape section that is pre-recorded with calibrated data for evaluating data durability on the magnetic tape 250 and/or for evaluating total transverse dimensional stability on the magnetic tape 250.

In embodiments where the special calibrated data is only included in certain section(s) of the media cartridge 20, other sections of the media cartridge 20 can include user data such that any given media cartridge 20 with section(s) that are pre-recorded with the described calibrated data can have user data in the other sections of the media cartridge 20. Stated in another manner, in such embodiments, the magnetic tape 250 can further include one or more data sections that are configured such that any desired user data can be written to and/or read from such data sections. Thus, in such embodiments, the magnetic tape 250 can be further used for restoring data using the data sections of the magnetic tape 250.

The library housing 14 is configured to retain various components of the tape library 10. For example, in the embodiment illustrated in FIG. 1, the plurality of storage slots 18, the rack assembly 22, the retrieval assembly 24, the one or more media drives 26 of the media drive system 12, the power supply 28, the control system 30, the rack(s) 32, and the climate controller 35 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped or any other suitable shaped cross-section. Further, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the media cartridge(s) 20. More particularly, in various embodiments, each of the storage slots 18 is configured to receive and retain a single media cartridge 20. It is noted that no media cartridges 20 are shown as being retained within the storage slots 18 in FIG. 1 for clarity.

The tape library 10 can include any suitable number of storage slots 18, and/or the tape library 10 can be designed to retain any suitable number of media cartridges 20. Moreover, the storage slots 18 can be arranged within the tape library 10 in any suitable manner. For example, in certain embodiments, the tape library 10 can include forty storage slots 18 arranged in two four-by-five storage areas. More particularly, in this embodiment, the tape library 10 includes two magazines 39, one on each side of the retrieval assembly 24, with each magazine 39 including four columns of storage slots 18, and with each column having five storage slots 18 oriented substantially horizontally one on top of another (with limited spacing therebetween). It is understood that from the simplified top view shown in FIG. 1, the number of storage slots 18 in each column is not readily apparent. Alternatively, the tape library 10 can include greater than forty or fewer than forty storage slots 18 and/or the storage slots 18 can be arranged in a different manner than is illustrated and described in relation to FIG. 1.

The media cartridges 20 can include a plurality of tape cartridges, or the media cartridges 20 can alternatively include a plurality of optical disks usable within an optical disk drive, magnetic disks usable within a magnetic disk drive, emulated tapes usable within an emulated tape drive, etc., as non-exclusive examples.

The design and configuration of the rack assembly 22 can be varied to suit the specific requirements of the tape library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a media cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The media storage retrieval assembly 24 selectively, e.g., upon request of a user, retrieves and moves the media cartridge 20 as desired between the storage slots 18 and the media drives 26. In particular, during use, upon receiving a signal from the control system 30 to access a certain media cartridge 20, the retrieval assembly 24 can be manipulated to physically retrieve the requested media cartridge 20 from its associated storage slot 18 in the tape library 10. Subsequently, the retrieval assembly 24 moves the media cartridge 20 to an appropriate media drive 26, and inserts the media cartridge 20 into a drive housing 40 of the media drive 26 so that the requested read/write operations can be performed. Upon completion of the requested read/write operations, the retrieval assembly 24 can then return the media cartridge 20 to an appropriate storage slot 18.

It is appreciated that although a single retrieval assembly 24 is illustrated in FIG. 1, the tape library 10 can be designed to include more than one retrieval assembly 24. For example, in one non-exclusive alternative embodiment, the tape library 10 can include two retrieval assemblies 24 that function in different portions of the tape library 10 and/or that provide redundancy in the event that one of the retrieval assemblies 24 fails.

The one or more media drives 26 are configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing therebetween). Alternatively, the media library 10 can include greater than three or fewer than three media drives 26 and/or the media drives 26 can be positioned in a different manner relative to one another. Depending on the specific design of the media library 10, the media drives 26 can be adapted for use with different types of media, such as tape cartridges, optical disks, hard disks, etc.

In certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one such embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the retrieval assembly 24, the control system 30, the climate controller 35 and/or additional media libraries 10. The power supply 28 can be interfaced with these components as well as with an external power source in a well-known manner using industry standard cabling and connections. Alternatively, the power supply 28 can be interfaced with these components in another manner.

The control system 30 provides the desired and necessary control for general functionality of the media library 10. The control system 30 can have any suitable design, many of which are well-known in the industry. For example, in one embodiment, the control system 30 can include a standard driver interface unit for receiving digital commands and translating the commands into driving currents, such as step pulses for controlling stepper motors, and/or for controlling the climate controller 35. Further, the control system 30 can include a standard programmable general purpose computer formed on a single plug-in card unit and can include a programmed microprocessor or microcontroller, memory, communication interface, control interface, connectors, etc. Alternatively, the control system 30 can have a different design and/or the control system 30 can be positioned within the media library 10 in a different position or manner than that illustrated in FIG. 1.

Additionally, the tape library 10 can use well-known industry standard cabling and communication protocols between the control system 30 and other structures of the tape library 10. Cabling and electrical characteristics including signaling protocols can be generally standardized, and the logical message protocols can be either proprietary or standardized as known to those skilled in the art.

As shown, the media library 10 can also include the GUI 34, such as an interactive touchscreen graphical user interface or another suitable graphical user interface, which allows the user to interact with and/or transmit requests or commands to and/or from the media library 10.

The climate controller 35 controls the climate within the library interior 16. In various embodiments, the climate controller 35 can regulate, adjust, control and/or maintain a specific climate within the library interior 16. In certain embodiments, at various times, the specific climate that is regulated, adjusted, controlled and/or maintained by the climate controller 35 within the library interior 16 can be based on an ambient climate outside of the library interior 16.

The temperature controller 36 regulates and/or adjusts the temperature within the library interior 16 of the media library 10. The design and/or particular type of temperature controller 36 included in the media library 10 can vary. For example, the temperature controller 36 can include one or more of an air conditioner, a chilled water cooler, a Peltier cooler, a vortex cooler, etc., or any other suitable type of temperature controller(s) that can selectively lower the temperature within the library interior 16. The temperature controller 36 can alternatively (or additionally) include a heating unit that can selectively increase the temperature within the library interior 16.

In various embodiments, the temperature controller 36 can include one or more temperature sensors 42 (only one temperature sensor 42 is illustrated in FIG. 1) that can sense an ambient temperature within or outside of the library interior 16. The temperature sensor 42 can generate temperature information that is based on the temperature that is sensed by the temperature sensor 42. Although the temperature sensor 42 is illustrated in FIG. 1 as being secured to or being integral with the temperature controller 36, in an alternative embodiment, the temperature sensor 42 can be spaced apart and/or separate from the temperature controller 36 within the library interior 16. Still alternatively, the temperature sensor 42 can be positioned outside of the library interior 16. In another embodiment, a plurality of temperature sensors 42 can be positioned in any suitable location(s), such as within and outside of the library interior 16 of the media library 10.

In certain embodiments, the temperature controller 36 can receive data from the temperature sensor 42. In one embodiment, this data can be used by the temperature controller 36 to automatically adjust and/or control the temperature within the library interior 16 in accordance with predetermined temperature standards set by a user, for example. Such adjustments of the temperature can be made at predetermined intervals, or at other times when temperature adjustment is needed. In certain embodiments, adjustments of the temperature can be mandated by command of a user at various times.

The humidity controller 38 regulates and/or adjusts the humidity within the library interior 16 of the media library 10. The design and/or particular type of humidity controller 38 included in the media library 10 can vary. For example, the humidity controller 38 can include any type of humidifier or dehumidifier, or any other suitable type of humidity controller 38 that can selectively change and/or control the humidity within the library interior 16. Further, any number of humidity controllers 38 can be used.

In various embodiments, the humidity controller 38 can include one or more humidity sensors 44 (only one humidity sensor 44 is illustrated in FIG. 1) that can sense the humidity within or outside of the library interior 16. Although the humidity sensor 44 is illustrated in FIG. 1 as being secured to or being integral with the humidity controller 38, in an alternative embodiment, the humidity sensor 44 can be spaced apart and/or separate from the humidity controller 38 within the library interior 16. Still alternatively, the humidity sensor 44 can be positioned outside of the library interior 16. In another embodiment, a plurality of humidity sensors 44 can be positioned in any suitable location(s), such as within and outside of the library interior 16 of the media library 10.

In certain embodiments, the humidity controller 38 can receive humidity information from the humidity sensor(s) 44. In one embodiment, this humidity information can be used by the humidity controller 38 to automatically regulate and/or adjust the humidity within the library interior 16 in accordance with predetermined humidity standards set by a user, for example. Such adjustments of the humidity can be made at predetermined intervals, at predetermined times of the day or night, or at other times when humidity adjustment is needed. In certain embodiments, adjustments of the humidity can be manually dictated by command of a user at various times as needed. In other embodiments, the humidity controller 38 can automatically regulate and/or adjust the humidity within the library interior 16 based on a particular climate outside of the library interior 16.

Figure 2:
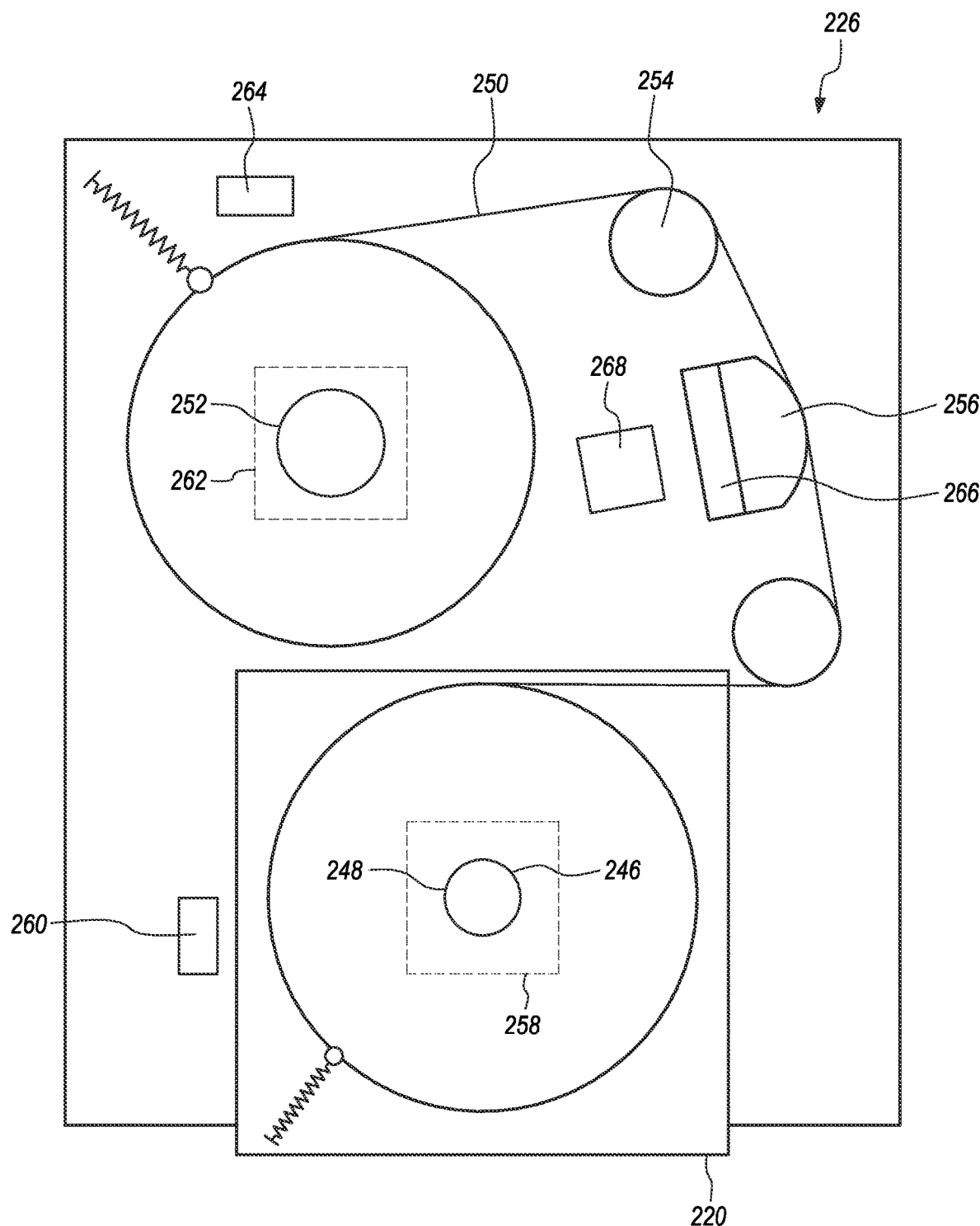
FIG. 2 is a simplified schematic top view illustration of a tape drive, and an embodiment of a tape cartridge having features of the present invention that has been inserted into the tape drive.

FIG. 2 is a simplified schematic top view illustration of a media drive 226, such as a magnetic tape drive, and an embodiment of a media cartridge 220, such as a magnetic tape cartridge, having features of the present invention that has been inserted into the media drive 226. It is appreciated that the media drive 226 as shown in FIG. 2 represents a generic tape drive, and is shown by way of example and not by way of limitation. In some embodiments, the media drive 226 operates in compliance with an LTO specification, such as LTO-7, LTO-8 or LTO-9. Stated in another manner, in such embodiments, the media cartridge 220 is an LTO-compatible tape cartridge.

During use of the media drive 226, the media cartridge 220 is inserted into the media drive 226 to read data from and/or write data to the media cartridge 220. As shown, the media cartridge 220 includes a cartridge reel 246 that includes and/or defines a cartridge hub 248. A magnetic tape 250 is spooled about the cartridge hub 248 of the cartridge reel 246. In certain embodiments, the magnetic tape 250 can include at least one servo track (not shown) and a plurality of data tracks (not shown) that run along a longitudinal length of the magnetic tape 250. Additionally, each of these tracks can be positioned substantially parallel to each other.

The media cartridge 220 includes a cartridge housing 220A and the magnetic tape 250 that is retained within the cartridge housing 220A. Thus, the media cartridge 220 supplies the magnetic tape 250 to the media drive 226. More particularly, when the media cartridge 220 is inserted into the media drive 226, one end of the magnetic tape 250 is taken up within the media drive 226 to be wrapped around a drive reel 252 included in the media drive 226. The magnetic tape 250 traverses a predefined path between the cartridge reel 246 and the drive reel 252, which is defined, a least in part, by one or more rollers 254 (two are shown in FIG. 2) positioned at strategic positions along the predefined path. The rollers 254 may also aid in limiting gross lateral movement (i.e. in and out of the page as shown in FIG. 2) of the magnetic tape 250, i.e. lateral tape motion or "LTM".

Along the predefined path, the drive reel 252 moves the magnetic tape 250 across a head 256, e.g., a read/write head, that is configured to read data from and/or write data to the magnetic tape 250. In particular, the head 256 is positioned in close proximity to the predefined path of the magnetic tape 250 such that as the magnetic tape 250 travels in the longitudinal direction (by being wound from the cartridge reel 246 to the drive reel 252 or vice versa) the head 256 can read/write data to a particular track and longitudinal position of the magnetic tape 250. Additionally, the head 256 can include one or more servo elements configured to read the servo track(s) of the magnetic tape 250 in order to effectively maintain proper alignment between the head 256 and the magnetic tape 250.

In some embodiments, as shown, the media drive 226 can also include a cartridge reel motor 258 (illustrated as a box in phantom) that generates the necessary force to rotate the cartridge reel 246 at will, and a cartridge reel encoder 260, e.g., a sensor or detector, that is configured to output signals representing the pulse rate (or rotation rate) of the cartridge reel motor 258. Additionally, the media drive 226 can further include a drive reel motor 262 (illustrated as a box in phantom) that generates the necessary force to rotate the drive reel 252 at will, and a drive reel encoder 264, e.g., a sensor or detector, that is configured to output signals representing the pulse rate (or rotation rate) of the drive reel motor 262.

As illustrated in this embodiment, the media drive 226 also includes an actuator 266 and a controller 268 that can be communicatively coupled to the head 256. The actuator 266 is configured to control the lateral position of the head 256 relative to the magnetic tape 250 based on a signal provided by the controller 268. As such, the actuator 266 comprises a mechanical positioner to move the head 256 up or down laterally. By controlling the lateral position of the head 256 relative to the magnetic tape 250, a particular track of the magnetic tape 250 can be accessed as desired.

The controller 268 is in communication with the actuator 266 and a number of other components within the media drive 226. For example, although not specifically shown in FIG. 2, each of the cartridge reel motor 258, the cartridge reel encoder 260, the drive reel motor 262, and the drive reel encoder 264 can be in communication with the controller 268. As such, the controller 268 can be configured to perform various specified operations, either individually, or in combination with other software, hardware and/or firmware elements.

Additionally, or in the alternative, in some embodiments, the media drive 226 can include additional heads and associated actuators so that more than one track of the magnetic tape 250 can be read from and/or written to simultaneously. For example, the servo track may have a dedicated head and the data tracks may use a separate head. Further, the head 256 may comprise two discrete components, i.e. one head for read operations and another head for write operations.

In various embodiments, all or one or more partitions of the media cartridge 220 and/or the magnetic tape 250 can be specially calibrated in order to ensure enhanced data durability and dimensional stability, which can both be impacted by the temperature and humidity conditions in which the media cartridge 220 and/or the magnetic tape 250 are being used. In some such embodiments, the magnetic tape 250 retained within the media cartridge 220 can include predetermined error patterns written within calibrated section(s) of the magnetic tape 250 to further assist with the determination of data durability. The temperature and humidity settings can also be adaptively and independently controlled with closed-loop feedback from such calibrated section(s) of the magnetic tape 250. Further, periodic tape scrubbing operations can also be incorporated within the calibrated section(s) of the magnetic tape 250 to more effectively ensure the highest data durability for archival and back-up applications.

In summary, a specially designed algorithm for controlling total transverse dimensional stability (TDS) is utilized within the media library 10 (illustrated in FIG. 1) by optimizing temperature and humidity while inhibiting condensation with calibrated media and data advanced tape operation (ATO) metrics based on durability, energy, and latency optimization. The noted algorithm is also configured to control media durability for written data such that over the life of the data, the error rates effecting media error rate and tracking quality are managed to provide user bit error rate (UBER) values that will result in minimum retires during read mode for selected environmental conditions.

Figure 3:
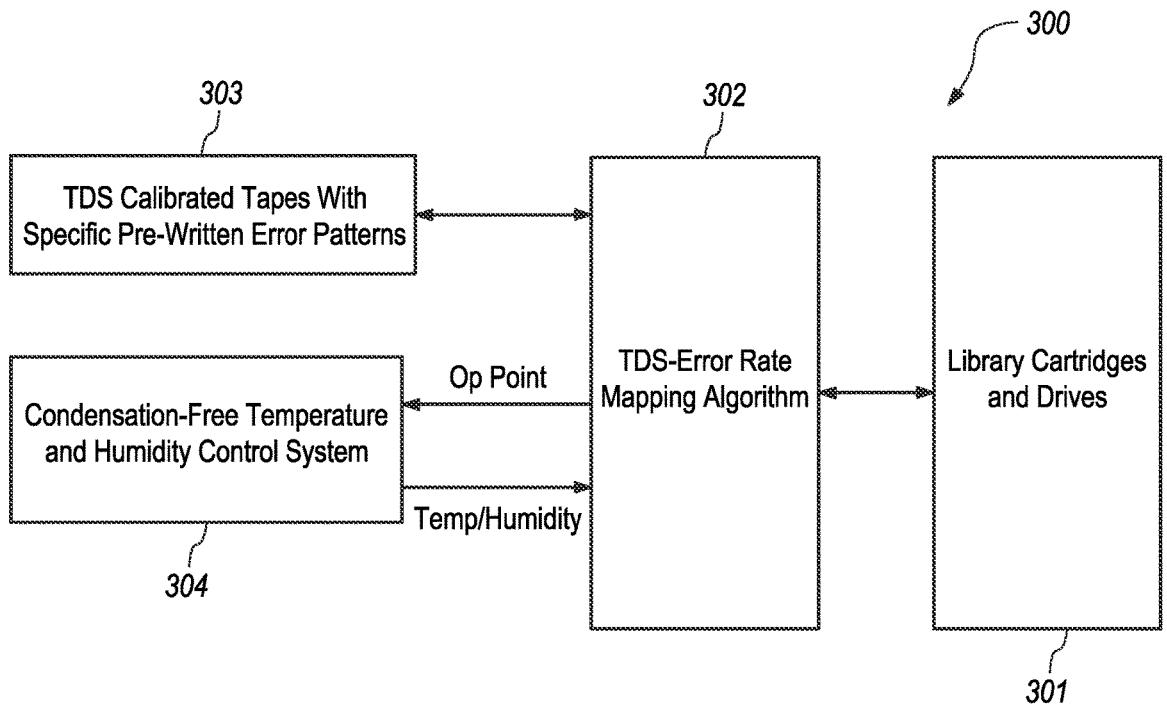
FIG. 3 is a simplified block diagram of a media library system showing transverse dimensional stability versus error rate mapping.

The algorithm includes one or more features and aspects such as described in detail in various embodiments. For example, the algorithm can be configured to write tracks under the conditions where dimensional stability errors are minimized for future reads at different conditions with calibrated media sections and tapes and data durability metrics. FIG. 3 is a simplified block diagram 300 of a media library system showing transverse dimensional stability versus error rate mapping (the "TDS-Error Rate Map"). In particular, FIG. 3 illustrates block 301 for library cartridges and drives, block 302 for a TDS-Error Rate Mapping Algorithm, block 303 for TDS-calibrated tapes with specific pre-written error patterns, and block 304 for a condensation-free temperature and humidity control system.

The algorithm can be configured to use the TDS-Error Rate Map to determine the temperature and humidity for writing such that the settings and track locations are optimized for read mode settings to minimize overall TDS. In some embodiments, the algorithm can be configured to use the TDS-Error Rate Map to determine the temperature and humidity for writing such that the settings and track locations are optimized for read mode settings to achieve overall TDS less than 300 ppm. The algorithm can further be configured to optimize settings for write mode based on the rate of change of lateral tape dimension as a function of temperature and humidity, which is a non-linear function. In particular, the algorithm can optimize such settings for write mode such that the selection of the conditions can be made to favor the higher rate of change region resulting in lower energy and shorter time delays during read modes.

Figure 4:
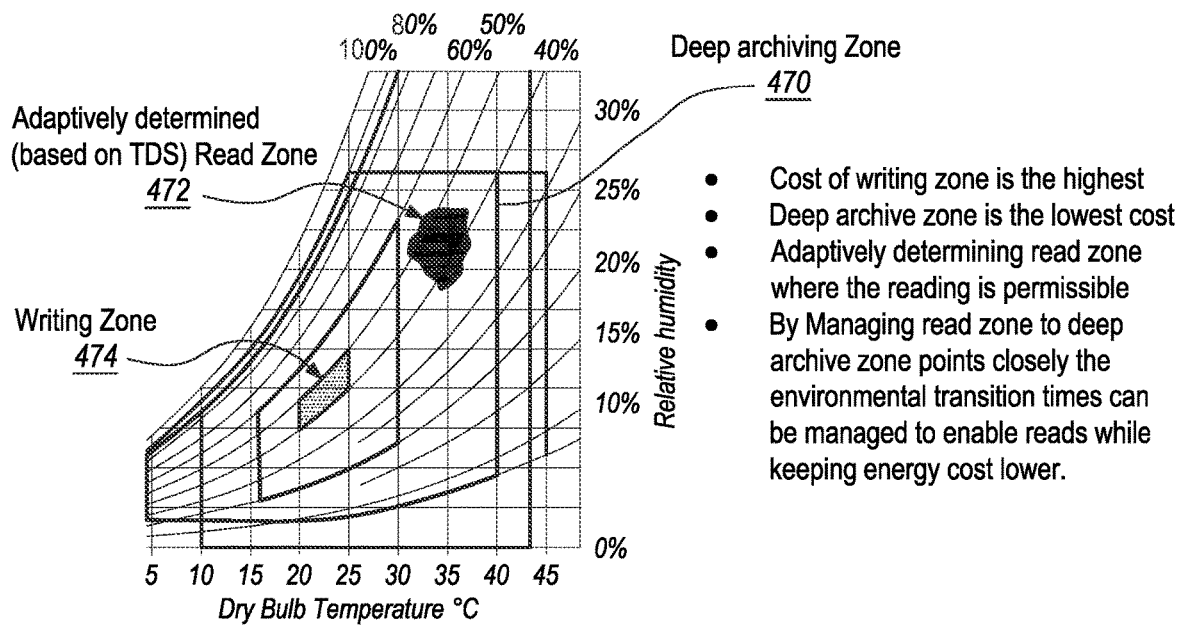
FIG. 4 is a graphical chart illustrating optimized archival conditions for reading and writing.

As illustrated, the TDS-Error Rate Map in FIG. 3 can demonstrate that the algorithm can be configured to optimize environmental conditions based on operating modes (write and read) and data temperature (hot or cold data) and life of the archival media. More specifically, the optimization algorithm is configured to run in the background and determine the TDS-Error Rate Map of the data where for the read mode error rates and time delays to first byte of data are computed using different environmental conditions where condensation is inhibited and retry operations are minimized. Initially, the algorithm is configured to determine temperature and humidity conditions as a function of error rates as dimensional stability starts to effect reader locations within previously written tracks. This is the map of written tracks that identifies error rates versus environmental conditions that can be described by a graphical psychrometric chart as shown in FIG. 4, so condensation is avoided at any given condition. In particular, FIG. 4 is a graphical chart 400 illustrating optimized archival conditions for reading and writing. More specifically, FIG. 4 shows the typical operating point versus psychrometric chart where writing and reading based on archival conditions are optimized for minimization of TDS and latencies and energy usage. As illustrated, FIG. 4 shows a deep archiving zone 470 (which is the lowest cost), an adaptively determined read zone 472 (based on TDS) where reading is permissible, and a writing zone 474 (which is the highest cost). It is understood that the writing zone 474 is very critical as it is most important to know when the writing can commence. Further, it is appreciated that by managing the adaptively determined read zone 472 to deep archiving zone 470 points closely, the environmental transition times can be managed to enable reads while keeping energy costs lower.

Additionally, using the TDS-Error Rate Map defined above in FIG. 3, the algorithm also determines time delays for media to stabilize for a given target environment relative to the current settings. This delay will play a critical role in minimizing latency to first data byte while minimizing energy consumption of the system. The algorithm is also configured to read pre-written tracks at different environments with different per written error patterns to determine the relationship between the actual data tracks and given environmental conditions to establish the TDS-Error Rate Map which defines error rates and latency to first byte as a function of environmental conditions for the existing recoded data. Moreover, the algorithm can also use a pre-written error pattern media section such as described herein which can also be on the tracks written at different environments to isolate drive issues from the environmental TDS issues to determine if observed error rates are due to TDS, faulty drive, or aged media.

In some embodiments, the algorithm is also configured to control data durability of media due to aging by periodic scrubs with ATO metrics. In such embodiments, with media determined to be aged, the system is configured to migrate the data to a new version.

Additionally or in the alternative, in certain embodiments, the media cartridge with an embedded specially calibrated data section (or partition) can be utilized with pre-written special data patterns that are usable to determine the quality of the data written to the media cartridge including TDS and aging-related deterioration when the media cartridges are stored long-term. In such embodiments, the media cartridges with such specially calibrated section(s) can be used to detect the health of the media cartridge and/or the magnetic tape, such as if the media is good or whether it needs to be migrated to a new media cartridge by checking the special calibrated section(s) and comparing them to the first-time conditions when the data was originally written.

In certain embodiments, the algorithm is further configured to set the operating point of the media cartridges and media library system based on the age of the data, where, as data ages, the environmental conditions are moved away from the original writing settings such that energy usage is minimized while latency to first byte of data is longer.

In some embodiments, the algorithm can also be configured to set the operating point of the media cartridges and the media library system based on the hotness of the data.

Additionally, in certain embodiments, the algorithm is further configured such that when data is requested by the user, the algorithm will calculate the closest environmental conditions where data can be read and where channel error rates are enough, such that use of the internal C1-C2 ECC of the magnetic tape can decode with minimum retries.

Subsequently, if the read fails, the algorithm can simply adjust the environmental conditions and retry.

In some embodiments, the algorithm is further configured to use the pre-written error pattern section of the media to isolate environmental and drive-related errors so determination of the environmental setting can be done based on the actual TDS effects of the track locations rather than drive read performance based on the condition of the readers.

It is appreciated that through the use of the algorithm as described in various embodiments, the media library system must be able to optimize the media cartridge readiness during transient events such as the library doors opening and closing while replacing media, and/or drive or system level repairs and maintenance. The special calibrated media section can also be used to assess when the media which was within the media library has stabilized after the transient event, thereby optimizing readiness of the media library system for full operation.

It is further appreciated that the optimization using the calibrated media can also be used during the initial media library bring-up phase when new media cartridges are used, and where media cartridges can come from unknown sources with unknown conditions. This information can then be used as the target new media stabilization period when the system is brought down to install a new media.

As described above, the areal density of storage media is a main contributor to tape capacity growth. Thus, as overall tape capacity continues to grow with new generations of storage media, the areal densities necessarily grow as well (and the size of the written bit gets smaller). Accordingly, such factors must be taken into consideration with the present invention, to compensate for thermal, hygroscopic and tension effects and where tension can be adjusted by the drive technology, and hydroscopic and thermal metrics are adjusted by the identified technology.

The algorithm as described in various embodiments further incorporates the use of tape scrubbing for periodic data durability checks. It is appreciated that with current scrubbing methods, the media is read tested with any random drive, but such scrubbing methods only address the deterministic hard errors where any drive from the drive pool can reliably identify the error in a given storage media. However, this requires a hard error event that is repeatable so it is an after the fact scenario. It cannot be used to address the problem with soft errors due to drive and media interchange issues. Unless the hard errors are 100% deterministic such as the tape being cut, a pin is dropped, or the media has a physical sectional or local physical damage (such as magnetic and defect acceleration, or edge or surface damage that affect tracking and stagger wraps) beyond the correction power of its internal ECC (Error Detect and Correct) format, the typical scrubbing method will still require more than one test sample to make a correct decision to repair and migrate data. This will mean repeating the scrubbing with another media drive from the pool, which is a time-costly process and not a guarantee unless a minimum of three media drives can be used to repeat the same test. For soft errors, this process is not an applicable one. Therefore, it is not an effective algorithm to estimate or even determine the errors with the storage media.

Accordingly, in various embodiments, the present algorithm is configured to use the entire tape and the media drives in a given media library to test and identify all errors, not only deterministic hard ones. However, it is appreciated that this can be accomplished without increasing total test time and latencies, and while minimizing the number of tape passes across the magnetic heads due to scrubbing.

Initially, the tape scrubbing aspect of the algorithm uses a deterministic means to split the magnetic tapes into multiple sections according to their format using longitudinal position (LPOS), wrap and data bands. Subsequently, a fixed number of sections from each magnetic tape are assigned to a given media drive such that a given magnetic tape will be scrubbed with all available media drives from the drive pool. However, overall scrub time will be nearly the same as when scrubbing a magnetic tape with a single media drive. By way of example, in one non-exclusive representative embodiment, an LTO-8 library can include 800 media cartridges and ten media drives (80:1 ratio). The drive transfer rate is 360 MB, and the media cartridge capacity is 12 TB. To scrub a tape with a single media drive will require a minimum of 9.25 hours. Scrubbing a tape with three media drives to establish a statistical result to determine if an error requires repair (except for 100% deterministic ones such as tape cut, dropped pin) will take a minimum of ninety days to complete and at the end the algorithm will have to make a decision based on a sample of three per media, which may not be sufficient to distinguish from media and drive problems. With the present algorithm, with the same configuration, with 52 wraps per data band and four data bands per LTO-8 format, each media drive can read four wraps per data bands total of 160 wraps per media cartridge using all ten media drives. To cover all 208 wraps with LTO-8 media cartridge, the media drives can be assigned uneven wrap numbers to read so the system can read a media cartridge with all ten media drives within the same time that it will take to read the same tape with a single media drive. However, such a process gives more data to determine the storage media or media drive problems separately. The algorithm can then use this data to identify bad media drives from the pool so test data from the bad media drives can be eliminated from the test database. The remaining data with good media drives, plus the additional testing of 48 remaining wraps per media cartridge, can be done using the good media drives from the pool. This data will be used to determine errors on the storage media, and based on the severity of the errors, the repair process can be initiated.

It is appreciated that because the specially-designed algorithm uses all media drives from the pool with all media cartridges in a multi-step process, which not only identifies bad media drives from the pool but also tests each media 100% without costing long latencies and long test times, the determination of errors can be made with a higher certainty using statistical calculations and modeling.

When establishing hard errors, the location and type of the error based on its repeatability with multiple media drives will be used. The location is the LPOS and wrap numbers where LPOS represents the longitudinal position of the tape and wrap numbers are rack locations across the tape from the top edge to bottom edge.

For soft errors, a relative means will be used to determine their level of severity. The relative calculation will be based on the characteristics of the data on the tape at time zero when it was first written. The archival system will capture and log data performance metrics, as defined below, for each section of the objects or records written to the tape. This data will be formatted and stored as the scrubbing metadata where the metadata can be stored with each media cartridge for self-identification. Alternatively, such data can be stored elsewhere. Such data will again include positional information with LPOS and wrap numbers. For instance, as a tape is written with user data, the performance metrics will be logged in real time using LPOS and wrap numbers periodically to cover the entire surface of the storage media with enough resolution. This data will serve as the baseline media durability map where subsequent reads are due to user request of pre-planned scrubbing. For example, the defects will be rewritten during the write mode so subsequent reads will not see the old defects, but new defects that were generated after the initial write process will be detected. The baseline durability maps can then be used to identify these types of defect acceleration that impacts data durability on tapes.

Typical performance metrics that can be captured include one or more of (i) Channel SNR and Equalization Frequency Response; (ii) Channel C1 correctable errors; (iii) Channel C1 uncorrectable errors and error Pareto based on error characteristics; (iv) Occurrence of Drive error recovery procedure; (v) Off Track events and track response shapes; (vi) Servo signal quality metrics; (vii) C2 codeword input errors based on Sub Data Sets in Read Mode; and (viii) Tape speed and tension estimation control loop metrics. It is appreciated that a given system may use a subset of the performance metrics, or there might be other performance metrics related to data and servo channels that might be required for the baselining and determination.

Such performance data will be captured and logged with tape position LPOS information and wrap number using a fixed number of recodes or file size such that the collected data will have equal sample size over the surface of the media from beginning of tape to end of tape, and top edge to bottom edge.

Each scrubbing will also be designed to capture the tape metrics (the read mode metric unless data is migrated) and append the performance data to the existing media scrubbing metadata such that the contents will have both time zero initial write mode and subsequent read mode scrub performance information.

The scrub task can also use the performance data captured from multi-drive and multi-cartridge testing and compare these read mode results with the initial time zero write mode and previous scrub metadata to determine and compute the soft error for a given storage media or a section of the storage media where this information can now be used to repair or migrate the data.

This concept achieves a deterministic means using statistical calculations to decide if the data on the storage media or the entire storage media needs to be repaired or migrated without the negative effect of drive-cartridge interchange issues with minimum test time, which is nearly the same as testing each media cartridge with a single media drive.

It is appreciated that the noted performance metrics can be used for detecting both soft errors and hard errors. Channel SNR and equalization-frequency-response are useful performance metrics for predicting soft errors and determining bad media drives and/or bad storage media. Low channel SNR represents that the media drive and/or the storage media is degraded, so a large number of soft errors are expected. Then channel SNR of the same storage media from other media drives should be compared to know if the low channel SNR is coming from the media drive or the storage media itself. If at least one channel SNR is good with other media drives, then the algorithm will determine that the storage media is good, but the media drive is bad. Otherwise, if the low channel SNR is not good with any other media drives, the algorithm will determine that the low channel SNR is coming from a degraded storage media. At such point, migration of data on the storage media should be considered.

Equalization frequency response is another good performance metric to know the head and/or media wear. If the coating on the head/media gets thinner, then high frequency boost from the equalizer gets smaller because the gap between the head and the storage media gets smaller. In this case, temporarily, channel SNR will increase, and the number of soft errors will decrease. However, sudden channel SNR drop and increased soft errors are expected soon because the head and/or storage media is close to end-of-life. Equalizer frequency response of the same storage media should be obtained from other media drives also and compared to know if the issue is coming from the head or the storage media. If the issue is coming from the storage media, data migration should be considered based on the degree of media wear.

Channel C1 correctable errors are a similar metric to channel SNR, but a small number means a good media drive and storage media. This metric can replace the channel SNR, or it can be used along with channel SNR for better reliability.

Meanwhile, channel C1 uncorrectable errors and Error Pareto are good performance metrics to identify hard errors and/or burst errors. Soft errors are usually correctable unless the number of soft errors is too large at the end-of-life. Therefore, uncorrectable errors are a good indication of hard errors and/or burst errors. Even if the errors are uncorrectable, the C2 decoder will clean up the remaining errors after C1 decoding. At such point, user data can still be recoverable. However, if the number of C1 uncorrectable errors increases, the probability of data loss (i.e. uncorrectable errors even after both C1 and C2 decoding) also increases. Therefore, at some point, data migration should be considered.

Error Pareto based on error characteristics is a histogram of errors based on the length of errors or based on the number of symbol errors per C1 codeword. This is a special metric that can identify both soft errors and hard errors. At the beginning of life, lengths of most errors are short and the number of symbol errors per C1 codeword is small. Long errors from hard errors and/or burst errors will also show up at the right corner of the histogram (i.e. long error or many symbol errors per C1 codeword) even at the beginning of life. However, as the head and/or storage media wears, the histogram will shift to the right (i.e. error length and number of symbol errors per C1 codeword will increase).

A weighting and aggregation algorithm can be applied to all performance metrics that can be collected during write/read of a chunk of data to come up with a single quality score to represent this operation from this media drive and this particular media cartridge. After the scrubbing with all data collected, a statistical multivariate analysis method can be used to grade each individual media drive or media cartridge. For example, in a ten media drive, 800 media cartridge library, using the scrubbing algorithm as described herein for each media drive, will provide a read quality score from 800 media cartridges. The sample size is large enough to ensure tight confidence level about the well-being of the media drive. For a given media cartridge, it will have ten quality scores, one from each of the ten media drives.

It is appreciated that modern tape drive systems have robust ECC with additional built-in error recovery procedures. Thus, unless in the most extreme cases, a media cartridge, even with an excessive number of soft errors and/or hard errors, can have its data still be recoverable in the most suitable media drive, although it may require multiple retries. As such, one way to use the analytical result described above would be to assign a data recovery cost (unit in time or money) to each media cartridge based on the ten quality scores (such as in the noted example). Additionally, it is further appreciated that each individual media library system can have its own predetermined cutoff level in order to decide whether a given media cartridge should be kept or replaced based on such quality scores.

The data collection process using the described algorithm can be executed either by the host via the host bus using SCSI commands, or by the media library using the library or ethernet port depending on the specific system architecture. In particular, such alternative executions are both applicable in a self-defined, self-describing, and self-maintained media library with built-in Artificial Intelligence or machine learning algorithms to determine the durability of data both during write as well as read modes for deep archival applications where written data may be recalled randomly. Such alternative executions of the data collection process are illustrated and described briefly in relation to FIG. 5 and FIG. 6.

Figure 5:
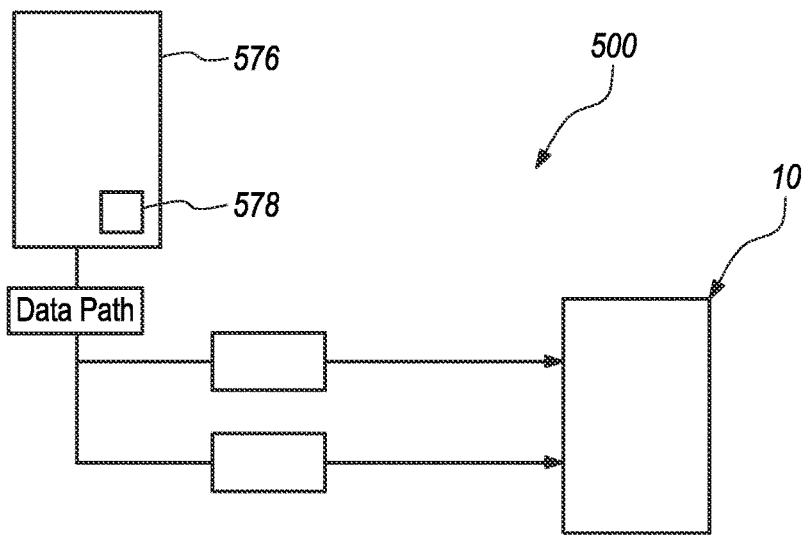
FIG. 5 is a simplified illustration of host side architecture of the media library system.

FIG. 5 is a simplified illustration of host side architecture 500 of the media library system 10 usable for implementing the data collection process. As illustrated in FIG. 5, the host 576 includes host software 578. The host software 578 will initiate function calls using the specially-designed algorithm within the media library system 10 as it performs read and write operations for a given media cartridge 20 (illustrated in FIG. 1). Once such data is captured and filtered in real-time, the host software 578 will process the data and reformat it as write mode and read mode, thus generating the scrubbing metadata. Additionally, the host software 578 may initiate a tape scrubbing operation with any given media cartridges 20 to establish data durability such as described in various embodiments. The host software 578 can also instruct or optimize operating environmental conditions in the library, e.g., temperature and/or humidity, based on results of such tape scrubbing operation. In certain implementations, the host software 578 can also initiate data tape migration as a function of the noted tape scrubbing operation.

It is appreciated that the host software 578 can further use such technique as described herein to isolate deteriorating tape drives so that such tape drives can be isolated or replaced so that systematic tape failures can be reduced.

Figure 6:
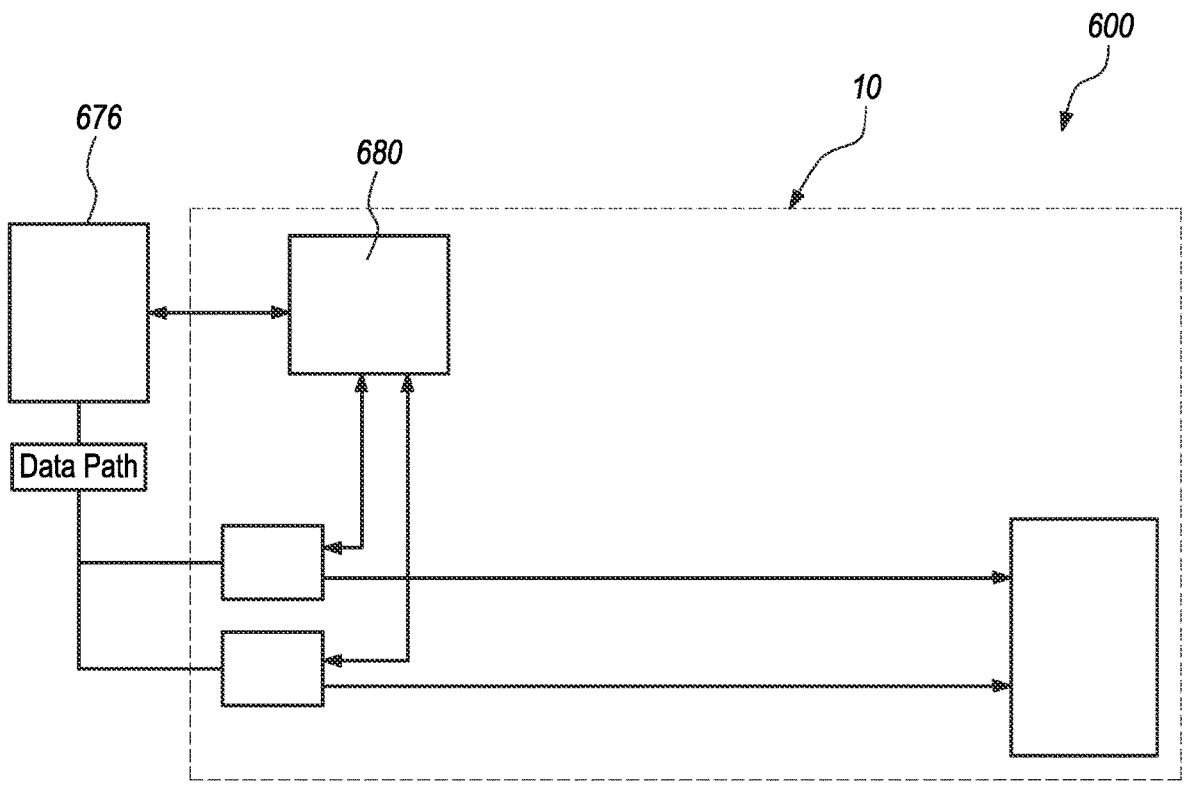
FIG. 6 is a simplified illustration of library port side architecture of the media library system.

FIG. 6 is a simplified illustration of library port side architecture 600 of the media library system 10 for implementing the data collection process. As illustrated in FIG. 6, the media library 10 includes library firmware 680. The host 676 is also illustrated in FIG. 6.

The library firmware 680 will monitor the library port bus for host commands and drive process. Periodically, the library firmware 680 will request to capture data and then it will filter the data. Once the data is captured and filtered in real-time, the library firmware 680 will process the data and reformat it as write mode and read mode, thus generating the scrubbing metadata. Additionally, the library firmware 680 may initiate internal tape scrubbing operations with any given media cartridges 20 (illustrated in FIG. 1) to establish data durability such as described in various embodiments. Further, the library firmware 680 can communicate the results via web services to the host system 676.

In some implementations, the library firmware 680 can further use this data collection and data analytics to identify potential tape drive magnetic head conditions such as debris clogs, stain-related sticky debris, or head wear, which can lead to loss of capacity and performance, and/or can lead to misclassification of tape data durability.

In certain embodiments, the collected and/or processed data can be stored in a local database with library electronics storage, and also be uploaded to cloud storage for purposes of building a larger database with other libraries for purposes of Artificial Intelligence (AI) or Machine Learning-based drive and media analysis.

The data collected by the library firmware 680 can also be used to evaluate how the host servers and local cache data management is utilizing drive pools within libraries such that transfer rates are optimized and tape drives are doing minimal shoeshines due to internal buffer issues.

As described in detail herein below, various embodiments of the overall closed loop-based optimization algorithm can be explained using five different methods. In particular, the optimization algorithm can be explained using methods such as (i) the use of calibrated cartridges to control the locations of written tacks with closed-loop operation; (ii) the use of relative PES measurements and surf writing to control the locations of written tacks with closed-loop operation; (iii) the use of adaptive surf writing to control the locations of written tacks with closed-loop operation; (iv) the use of joint adaptive surf writing where the environment is controlled by the data center, but media dimensional stability conditions are assisted by the media library system; and (v) the use of calibrated cartridges in data center applications.

Figure 7:
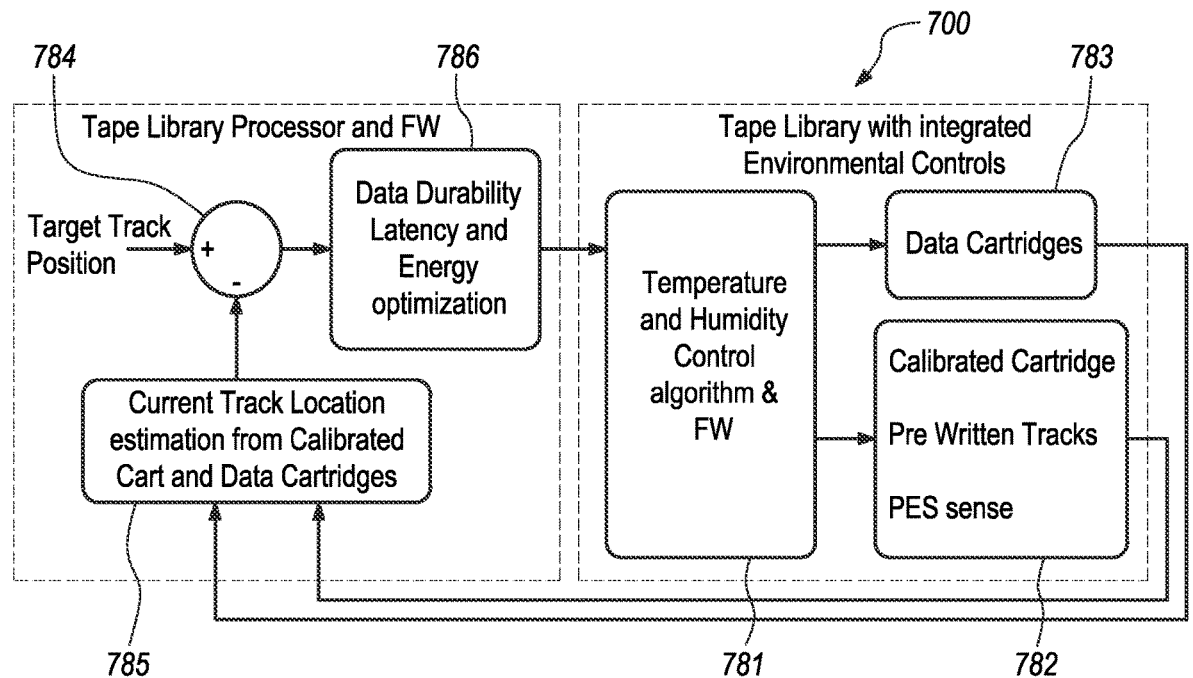
FIG. 7 is a simplified block diagram of a calibrated cartridge-based transverse dimensional stability servo loop usable within the media library system.

FIG. 7 is a simplified block diagram of a calibrated cartridge-based transverse dimensional stability servo loop 700 (also sometimes referred to simply as a "servo loop") usable within the media library system 10 (illustrated in FIG. 1). As illustrated, the block diagram of FIG. 7 includes the following blocks: (i) an environmental controls block 781; (ii) a calibrated cartridge block 782; (iii) a data cartridges block 783; (iv) a target track position block 784; (v) a track location estimation feedback algorithm block 785; and (vi) a data durability, latency and energy optimization algorithm block 786.

The environmental controls block 781 includes a main environmental control mechanism and algorithm executing with firmware and processor that servos temperature and humidity based on requested reference points while preventing condensation using internal controls.

The calibrated cartridge block 782 encompasses the basic feedback mechanism part of the servo loop 700. Calibrated tracks will provide a feedback signal indicating where on the written tracks a given similar media has stabilized such that error rates are in the middle of the bathtub curve. This means for a given library configuration, the media cartridges have balanced water molecules where error rates are minimized. PES signals from the servo heads and the servo format will also be used as additional feedback signals. In some configurations, only minimum single zone representing the ideal operating conditions are needed.

The data cartridges block 783 encompasses the plan for the servo loop 700 and the PES signals from the servo heads and the servo format being used as feedback signals.

The target track position block 784 determines optimum position of written tracks based on the pre-determined TDS based location.

The track location estimation feedback algorithm block 785 encompasses estimating the present track locations for environmental controls and estimates data tape track locations using a correlation to the calibrated cartridge using PES signals from both.

The data durability, latency and energy optimization algorithm block 786 entails loop control based on a typical optimization algorithm such as Simplex Method.

The concept of the servo loop 700 is to maximize durability of written data while minimizing energy cost and latency based on feedback from calibrated media and the data media. In this servo loop 700, a given environmental condition is not necessarily controlled for all media all the time. However, by determining the conditions based on a pre-established target track location to minimize the effects of TDS such that regardless of TDS and media, the tracks on media cartridges are always written based on a consistent position.

For the volume of a given media library and the amount of water absorbing materials, the amount of water absorbed by each storage media may differ based on the physical configuration such as the number of media cartridges, different types of materials and their absorption characteristics. Therefore, at a given humidity condition, the final water content of each storage media may be a function of configuration which will result in that storage media to be stabilized at a different TDS value. This is the variation that may be encountered in this type of system making the open loop during transients resulting in potential errors in written track locations, since it is not quite known exactly when the media cartridges are eventually stabilized with correct water molecule content to ensure the correct track locations as a function of TDS.

Additionally, the use of calibrated media with known track profiles will provide the feedback information that will indicate the stabilization condition of the media based on reading the calibrated cartridge or cartridges.

Further, when the system is at a given temperature and humidity condition where the humidity is expressed as a relative humidity, based on the amount of water molecules in the local environment and water absorbing material other than media and amount of media, the calibrated cartridge will stabilize at the dimensional stability point where the reading drive can learn this setting by the tracks that will provide the best error rates.

In the writing mode, the track locations must be in optimum condition to minimize TDS ppm values for high durability reads. The calibrated cartridge has the information such that the media drive reading the storage media can figure out when this cartridge matches its best and lowest TDS ppm condition. Therefore, during the write mode, the closed loop servo will determine the actual temperature and humidity setting at which the calibrated media has stabilized, such that the TDS ppm is minimized based on the error rates that eventually matches to the target track that has minimal TDS ppm. Theoretically, the environmental setting for the media library must match the setting for the calibrated cartridge when it was generated. However, based on the water absorption characteristic of all the storage media in the media library and the water content of the media library for the relative humidity sensed, the actual condition may be different during transient which makes the closed loop a necessity.

Additionally, the storage mode is the mode where the data written is not required to be read, but rather is stored in cold archival mode. In this case, the media conditions may be dependent on the condition of all of the media cartridges in the given media library. Thus, when the media cartridges are full and ready to be archived, the conditions of the environment may be determined using the optimization algorithm with the help of the servo loop 700.

It is appreciated that although FIG. 7 illustrates the data cartridges and the calibrated cartridge as separate cartridges, in certain implementations, the data cartridges can be configured with special partitions, sections or zones with internal calibration data where such data can be part of a pre-calibration during an initial write process.

Figure 8:
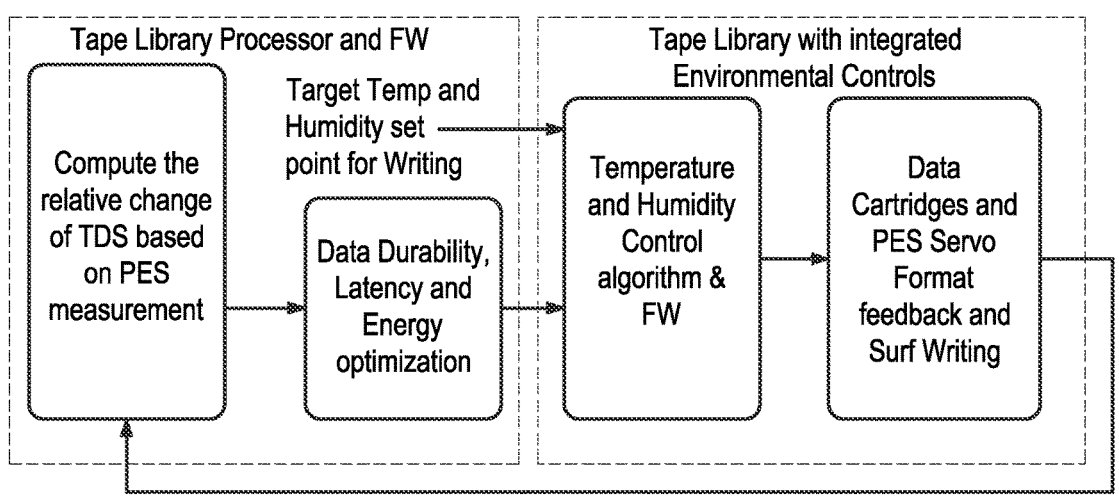
FIG. 8 is a simplified block diagram of relative position error signal feedback and surf writing-based closed loop transverse dimensional stability control usable within the media library system.

FIG. 8 is a simplified block diagram 800 of relative position error signal feedback and surf writing-based closed loop transverse dimensional stability control (also sometimes referred to simply as a "TDS loop") usable within the media library system 10 (illustrated in FIG. 1). In this approach, it is appreciated that the media library and/or the noted algorithm does not use calibrated media, such as in other embodiments, but rather utilizes relative position error signal (PES) measurement coupled with special surf writing to identify when it is safe to write. Subsequently, the media library and/or the algorithm continues monitoring the conditions of writing after the initial write which will follow the stabilized position of the TDS loop 800.

In such embodiment, the algorithm encompasses certain features and/or characteristics that enable the desired enhanced data durability and dimensional stability. For example, with the media library commanded to write following a transient condition such as following repairs, maintenance or placement of new media, the environmental controls will be commanded to reach a pre-assigned, or target, temperature and humidity set point for writing which may be determined based on the use of a calibrated media data that was done as part of a system calibration. Additionally, the system will write initial tracks at the start with the storage media being in an unknown stage, and the system will also log the relative PES data for the media cartridges being written and store these as the starting position base line data. As the library environmental conditions move towards the set point with a pre-established ramp limiting rate of change of temp and humidity, the system will read the relative PES data, and read pre-written tracks for channel performance such as error rates. When the storage media stabilizes at the target operating point, the data tracks written at time zero will show higher errors, such as top and bottom channels showing higher errors indicating a change in the dimension and relative PES change to confirm the TDS change. Thus, the media library processor and firmware are configured to compute the relative change in TDS based on the PES measurement. This, in turn, helps to achieve the desired data durability, latency, and energy optimization.

The system will then again rewrite tracks and repeat this until the system observes no significant change in either relative PES or data tracks. The algorithm will further address the cases when the storage media starts with a different amount of water molecules. This includes the case when the media water content is nearly the same as the final operating point, such that the media cartridges may end up changing their water contents during the transient mode, but still end up at the initial point when stabilized. With such design, it is appreciated that the use of relative PES and surf data writing will be used to identify these conditions.

In another methodology, the overall closed loop-based optimization algorithm utilizes adaptive surf writing based TDS closed loop control. In such methodology, the library system does not have PES reading capability and there are no calibrated cartridges. Again, the problem being solved is to establish when the media water molecule content stabilizes at the target operating point such that the tracks can be written at the correct location, meaning transient conditions being controlled. With this method, the idea is to write tracks and observe the change in channel performance as environmental conditions change, then rewrite the tracks and keep doing this (write, detect change in error rates, performance and rewrite) until the system is stabilized. This is determined by the steady-state condition when the channel performance and error rates do not change as the operating point of temperature and humidity is reached.

More particularly, with such methodology, the simplified algorithm performs the following steps for the writing mode:

(i) at time zero, tracks are initially written to the storage media; (ii) the tracks are then monitored by reading them using channel performance metrics such as error rates; (iii) when an error rate change is detected, the tracks are rewritten to the storage media; (iv) the rewritten tracks are continuously monitored for change while also monitoring the library environmental conditions; (v) as the environmental conditions are stabilized at the target set point, the algorithm continues to monitor error rates and if change is detected, the tracks are again rewritten to the storage media; and (vi) when the error rates do not change, and when the library environmental conditions are stable at the target point, the system has converged to the correct TDS settings such that the data can be written to the storage media. It should be noted that the environmental conditions, the time for stabilization, and the error rates will be logged while the system is in the transient mode, settling to the final point where the writing starts. This data will be used as a calibration to estimate time delay.

Once the tracks are written to the storage media, the environmental conditions for the read mode can be also determined using an adaptive method based on channel performance and error rates. For example, a sample algorithm can include the following steps for read mode. Initially, with the environmental conditions being set to write mode conditions, the algorithm starts moving the temperature and humidity with a specific rate towards the read mode set point which can be determined by a calibrated system. The environmental controls will be directed to move to the final set point in steps where at each step it will wait for validation of the channel performance metrics for the actual written data. When the environmental point where error rates are no longer enough to guarantee reliable read operation with the media drive able to stream at max speed, the edge of the psychrometric chart for the read mode media environmental condition has been reached and identified. The system will maintain this environmental condition while the media is archived in cold mode, but ready to be read with enough error rates and performance yet with a lower energy consumption.

Figure 9:
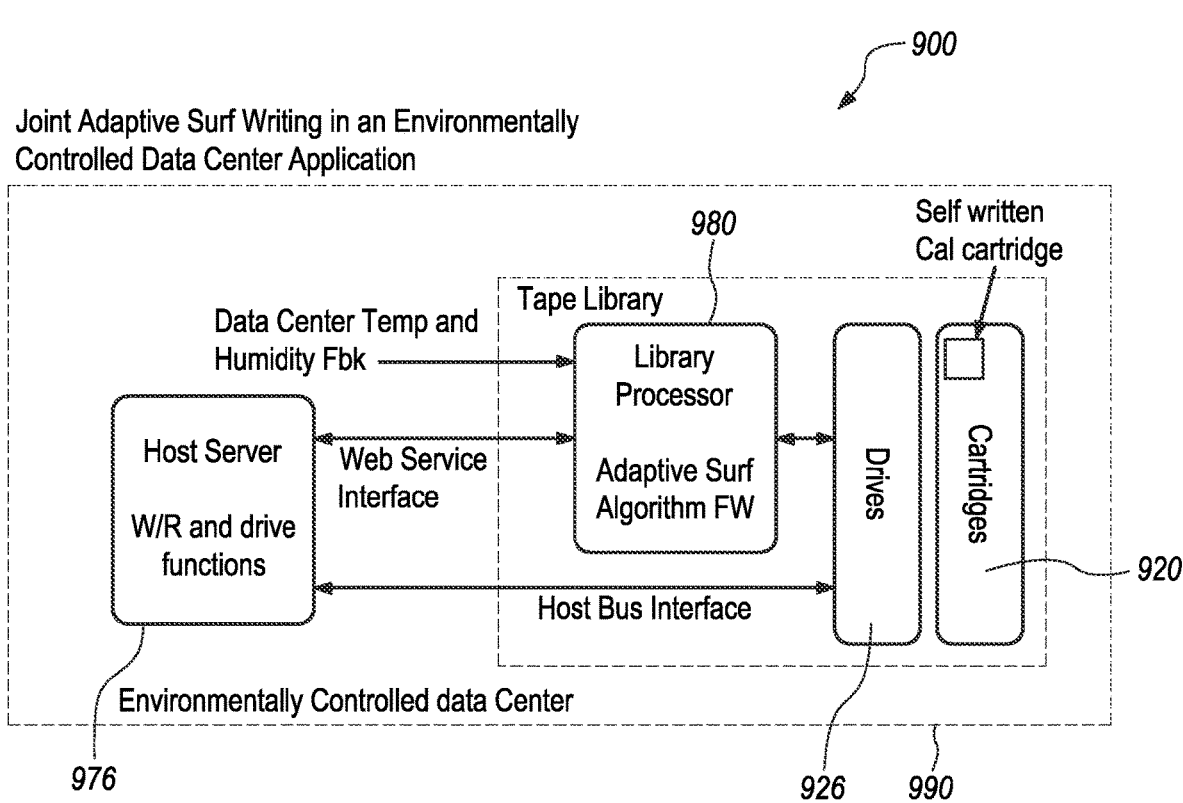
FIG. 9 is a simplified block diagram of joint adaptive surf writing transverse dimensional stability control usable within the media library system.

In still another methodology, the overall closed loop-based optimization algorithm utilizes joint adaptive surf writing for data center applications. Stated in another manner, another configuration of the adaptive surf writing method is a joint adaptive surf writing where the data writing and reading is managed by the host system and the servo loop filter and optimization algorithm for surf writing with adaptation is executed by the library firmware and hardware. This is shown in FIG. 9, which is a simplified block diagram 900 of joint adaptive surf writing transverse dimensional stability control usable within the media library system 10 (illustrated in FIG. 1). In this embodiment, the steps of the algorithm are jointly executed by the host server 976 and the library processor 980 for an environmentally-controlled data center 990.

In such embodiment, the environmental controls are conducted by the data center 990. The host server 976 controls the functions of writing data to and reading data from the magnetic tapes as instructed by the library firmware. The library and the host communicate via a web service interface. The library monitors the temperature and humidity of the data center 990 and internal conditions for the storage media 920 and the media drives 926. The library also captures the media cartridge performance metrics.

During operation of the media library system 10, the media library implements the adaptive surf writing algorithm that decides when the tracks need to be rewritten (these are all trimmed tracks). The media library then informs the host 976 via the web services interface to write a new set of trimmed tracks for the new environmental conditions in which the storage media 920 has been stabilized. Additionally, the media library also indicates to the host 976 when the system is stabilized within the correct temperature and humidity zone. The trimmed tracks are then read with the media TDS stabilized in this setting, so that the host 976 can write the data.

It should be noted that even though the media library is not controlling the environment under this methodology, the method of determining when TDS is stabilized is still an optimization process.

In yet another methodology, the overall closed loop-based optimization algorithm utilizes calibrated cartridges data center applications. The advantage of using a pre-calibrated media cartridge, such as the one described here, is that the surf writing will not be required. The host can now use the calibrated media to determine when the system reaches a stable condition such that the tapes can be written. However, it is further appreciated that this may still include a version of surf writing for the new tapes that are imported into the library from unknown conditions.

A general description of the calibrated TDS reference media will now be provided. For example, for advanced tape systems such as LTO-8 and beyond, the media drive and the storage media can operate in a wide range of environmental conditions. However, it is appreciated that the large tape transverse dimensional stability (TDS) limits the operation to a much tighter range in order to maintain head/track location compatibility. Thus, a specially written reference tape can be used to assist the media library more effectively manage the TDS constraint so that the data recorded on storage media can be retreated reliably later.

By way of introduction, in magnetic tape-recording systems, one of the key parameters is the transverse dimensional stability (TDS) which is the percentage change in tape width when measured under different environmental conditions. In particular, it is appreciated that the TDS for a typical LTO-8 tape varies depending on whether the environmental conditions are standard ambient environmental conditions, e.g., 25° C./20% RH, or whether the LTO-8 tape is used within or at the corners of allowable environmental conditions, e.g., cold-dry: 10° C./10$ RH, or hot-wet: 29° C./80% RH.

Previous experience with LTO-8 tape and expected results with LTO-9 tape confirms degradation of read performance as the environmental conditions for read drift away from the environmental conditions that existed during write mode. Thus, the challenge is to reliably read data that has been written under different TDS. A common approach is to monitor and tightly control the temperature and humidity. Due to the slow time (from hours to several days) for the media cartridge to reach equilibrium with the environment, the relation between that and the cartridge true TDS could be quite uncertain. Hence, this approach can be greatly enhanced by monitoring the cartridge TDS at the time to close the control loop. However, to conduct in-drive TDS measurement requires proprietary knowledge only available to the original drive manufacturer. For others, a direct read performance assessment with the proposed TDS reference tape could be a working alternative to provide similar insight.

To generate an appropriate reference tape, the tape is divided into multiple sections. For each section, data is written/trimmed under specific environmental conditions that range from the lowest to the highest temperature and relative humidity values. For example, the sequence of environmental values from (10° C./10% RH) to (30° C./80% RH) can be set in steps of (2° C./7% RH). For each environment setting step, the tape is first shuttled continuously until equilibrium is reached, then two wraps are appended. The resulting data pattern on the forward wraps of such reference tape includes (i) Wrap 0, 1 (10° C./10% RH); (ii) Wrap 2, 3 (12° C./17% RH); (iii) Wrap 4, 5 (14° C./24% RH); (iv) Wrap 6, 7 (16° C./31% RH); (v) Wrap 8, 9 (18° C./38% RH); (vi) Wrap 10, 11 (20° C./45% RH); (vii) Wrap 12, 13 (22° C./52% RH); (viii) Wrap 14, 15 (24° C./59% RH); (ix) Wrap 16, 17 (26° C./66% RH); (x) Wrap 18, 19 (28° C./73% RH); and (xi) Wrap 20, 21 (30° C./80% RH).

In generating such a reference tape, it is appropriate to consider a few important details. For example, the aging TDS should be fully neutralized before a media cartridge can be used to record the above patterns under each corresponding TDS conditions. According to U832, the aging process is to dwell the cartridge in 40° C., 20% RH environment for 10 days. If possible, it is recommended to add separate periodic TDS measurements for verification. Additionally, for each step, the tape should dwell in the established environment long enough so that the dimension is stabilized before appending/writing. According to U832, the stabilization process could take 20 hours continuous shuttle. If possible, it is recommended to add separate periodic TDS measurements for verification. The media cartridge can also be partitioned and generate the above pattern for one central data band (data band 0 or 1), and one edge data band (data band 2 or 3). This way, this reference tape can be used to reveal TDS variation not only along the tape length, but also in the transverse direction. For the remaining two data bands, to maximize the function of this available resource, one data band can contain multiple sections of diagnostic data for checking the readers, and the remaining data band/partition can be used as the writable partition for checking the writers.

In summary, the foregoing is used to describe how to generate and use a reference tape to effectively reflect the current cartridge TDS condition when merged under a certain environmental condition. The TDS reference tape can be more useful than just maintain a universal idea environmental condition for library operation. It also enables the media library to more actively manage the TDS issue. For example, an individual media library, based on its demographic weather pattern, can open in its own most efficient sweet zone. For an individual media cartridge during write operation, this condition will be stored into the cartridge memory. The long-term data migration issue, even if cartridges have been transferred to different library locations, can be properly handled with confirmed data from the TDS reference tape to be in the proximity of the write condition stored in the cartridge memory.

Figure 10:
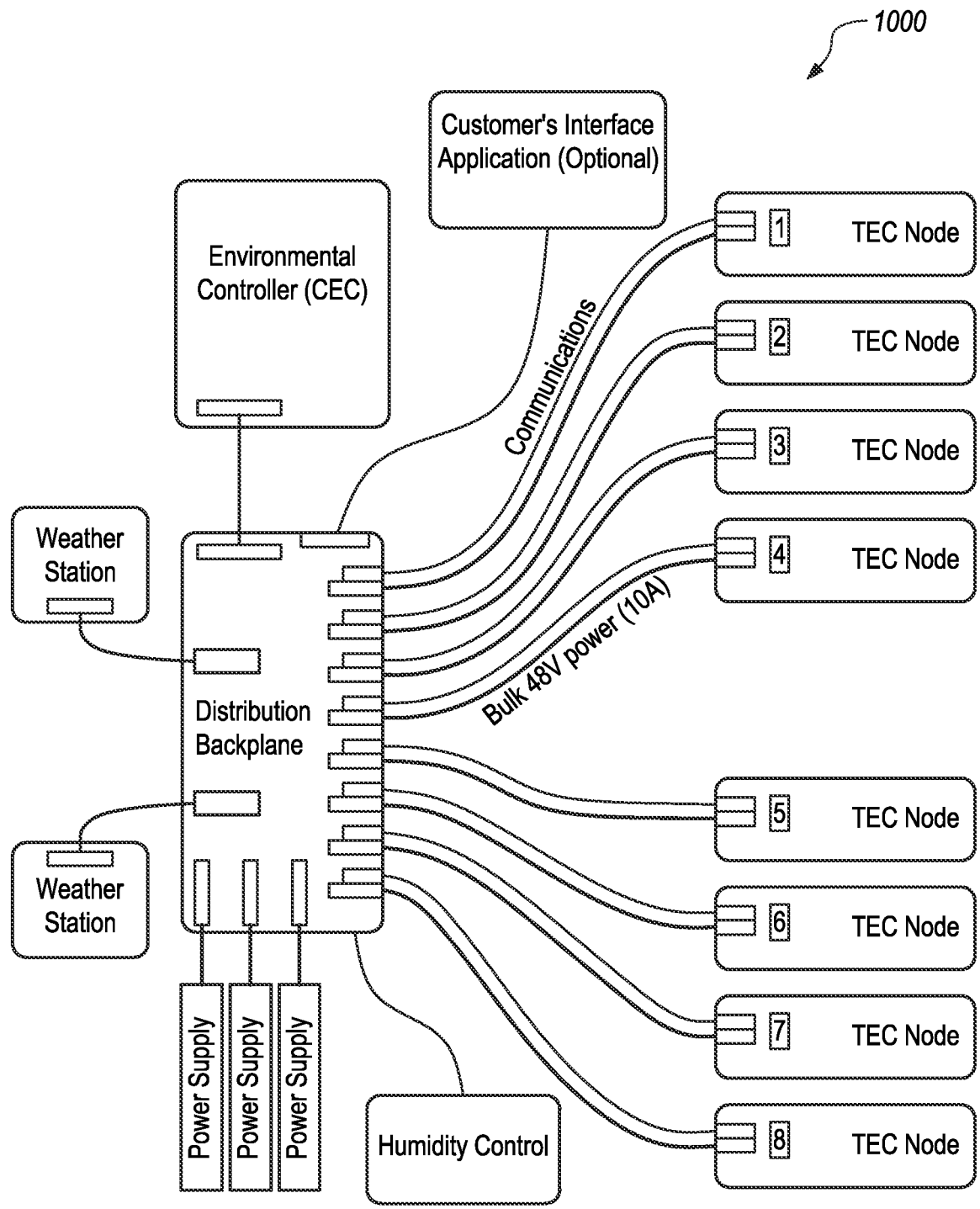
FIG. 10 is a simplified block diagram of an environmental control system with orthogonal temperature and humidity control and where condensation is inhibited, which is usable within the media library system.

FIG. 10 is a simplified block diagram of an environmental control system 1000 with orthogonal temperature and humidity control and where condensation is inhibited, which is usable within the media library system. More specifically, FIG. 10 illustrates a portion of the hardware electronic control system in the form of an environmental control system 1000 for purposes of providing desired reference information.

It is understood that although a number of different embodiments of the media library system have been illustrated and described herein, one or more features of any one embodiment can be combined with one or more features of one or more of the other embodiments, provided that such combination satisfies the intent of the present invention.

While a number of exemplary aspects and embodiments of the media library system have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope.

What is claimed is:

1. A tape library comprising:
one or more tape drives;
a tape cartridge for use in the one or more tape drives, the tape cartridge including a cartridge housing; and a magnetic tape that is retained within the cartridge housing, the magnetic tape including a first tape section that is pre-recorded with calibrated data for evaluating data durability on the magnetic tape; wherein the magnetic tape is usable within the tape library to one of measure a health of the one or more tape drives and confirm a suitability of an operating environment within the tape library in terms of at least one of temperature and humidity; and
a controller including a processor that is configured to implement an algorithm that adapts for variable environmental conditions in terms of at least one of temperature and humidity based at least in part on a reading of the magnetic tape by the one or more tape drives;
wherein the algorithm is configured to use a transverse dimensional stability versus error rate map to determine an optimal temperature and humidity for writing to the magnetic tape while limiting overall transverse dimensional stability.

2. The tape library of claim 1 wherein the magnetic tape is usable within the tape library to both measure the health of the one or more tape drives and confirm the suitability of the operating environment within the tape library in terms of at least one of temperature and humidity.

3. The tape library of claim 1 wherein the first tape section includes predetermined error patterns to assist in evaluating the data durability on the magnetic tape.

4. The tape library of claim 1 wherein the first tape section includes periodic tape scrubbing operations to enhance data durability on the magnetic tape.

5. The tape library of claim 1 wherein the magnetic tape further includes at least one data section that is configured such that user data can be written to and read from the at least one data section.

6. The tape library of claim 5 wherein the magnetic tape is further usable within the tape library to restore the user data using the at least one data section.

7. The tape library of claim 1 comprising a plurality of tape drives; wherein the tape cartridge is usable in the plurality of tape drives for measuring the health of the plurality of tape drives.

8. A tape library comprising:
one or more tape drives;
a tape cartridge for use in the one or more tape drives, the tape cartridge including a cartridge housing; and a magnetic tape that is retained within the cartridge housing, the magnetic tape including a first tape section that is pre-recorded with calibrated data for evaluating data durability on the magnetic tape; wherein the magnetic tape is usable within the tape library to one of measure a health of the one or more tape drives and confirm a suitability of an operating environment within the tape library in terms of at least one of temperature and humidity; and a controller including a processor that is configured to implement an algorithm that adapts for variable environmental conditions in terms of at least one of temperature and humidity based at least in part on a reading of the magnetic tape by the one or more tape drives;

wherein the algorithm is configured to use a transverse dimensional stability versus error rate map to determine an optimal temperature and humidity for reading from the magnetic tape while limiting overall transverse dimensional stability.

9. The tape library of claim 8 wherein the magnetic tape is usable within the tape library to both measure the health of the one or more tape drives and confirm the suitability of the operating environment within the tape library in terms of at least one of temperature and humidity.

10. The tape library of claim 8 wherein the first tape section includes predetermined error patterns to assist in evaluating the data durability on the magnetic tape.

11. The tape library of claim 8 wherein the first tape section includes periodic tape scrubbing operations to enhance data durability on the magnetic tape.

12. The tape library of claim 8 wherein the magnetic tape further includes at least one data section that is configured such that user data can be written to and read from the at least one data section.

13. The tape library of claim 12 wherein the magnetic tape is further usable within the tape library to restore the user data using the at least one data section.

14. The tape library of claim 8 comprising a plurality of tape drives; wherein the tape cartridge is usable in the plurality of tape drives for measuring the health of the plurality of tape drives.

15. A method for evaluating a tape library including one or more tape drives, the method comprising the steps of:

retaining a magnetic tape within a cartridge housing of a tape cartridge;

pre-recording a first tape section of the magnetic tape with calibrated data for evaluating data durability on the magnetic tape;

reading the magnetic tape with the one or more tape drives;

using the magnetic tape within the tape library to one of measure a health of the one or more tape drives and confirm a suitability of an operating environment within the tape library in terms of at least one of temperature and humidity; and implementing an algorithm with a controller including a processor that adapts for variable environmental conditions in terms of at least one of temperature and humidity based at least in part on a reading of the magnetic tape by the one or more tape drives;

wherein the algorithm is configured to use a transverse dimensional stability versus error rate map to determine an optimal temperature and humidity for one of writing to the magnetic tape and reading from the magnetic tape while limiting overall transverse dimensional stability.

16. The method of claim 15 wherein the magnetic tape is usable within the tape library to both measure the health of the one or more tape drives and confirm the suitability of the operating environment within the tape library in terms of at least one of temperature and humidity.

17. The method of claim 15 wherein the step of pre-recording includes pre-recording the first tape section by including predetermined error patterns to assist in evaluating the data durability on the magnetic tape.

18. The method of claim 15 wherein the step of pre-recording includes pre-recording the first tape section by including periodic tape scrubbing operations to enhance data durability on the magnetic tape.

19. The method of claim 15 further comprising the step of writing user data to at least one data section of the magnetic tape.

20. The method of claim of claim 19 further comprising the step of restoring the user data within the at least one data section using the magnetic tape.

* * * * *